United States Patent [19]

Cramaro

[11] Patent Number: 5,211,440
[45] Date of Patent: May 18, 1993

[54] SAFETY MECHANISM FOR VEHICLE TARPAULIN SYSTEM

[75] Inventor: Michael C. Cramaro, Newark, Del.

[73] Assignee: Cramaro Tarpeulin Systems, Inc., New Castle, Del.

[21] Appl. No.: 806,314

[22] Filed: Dec. 13, 1991

[51] Int. Cl.⁵ ............................................. B60J 11/00
[52] U.S. Cl. ..................................... 296/98; 160/188; 160/309
[58] Field of Search ................. 296/98, 100; 160/309, 160/303, 133, 188; 242/84.8; 254/376, 368

[56] References Cited

U.S. PATENT DOCUMENTS

| | | | |
|---|---|---|---|
| 2,343,884 | 3/1944 | Coffing | 254/376 X |
| 2,561,138 | 7/1951 | Sasgen | 254/376 X |
| 2,894,610 | 7/1959 | Harrington | 254/368 X |
| 3,138,231 | 6/1964 | Lock | 254/368 X |
| 3,549,199 | 12/1970 | Sibley | 296/100 |
| 4,236,694 | 12/1980 | Kristensson | 254/376 X |
| 4,463,933 | 8/1984 | Schreyer et al. | 254/368 |
| 5,054,840 | 10/1991 | Wilhite | 296/98 |

FOREIGN PATENT DOCUMENTS

| | | | |
|---|---|---|---|
| 237932 | 3/1962 | Australia | 254/376 |
| 2749560 | 5/1979 | Fed. Rep. of Germany | 296/98 |
| 366539 | 2/1932 | United Kingdom | 296/98 |

OTHER PUBLICATIONS

"Pioneer Cover-all", Pioneer Consolidated Corp., Model G1500 DR Apr. 1991.

Primary Examiner—Russell D. Stormer
Assistant Examiner—Gary C. Hoge
Attorney, Agent, or Firm—Connolly & Hutz

[57] ABSTRACT

A safety mechanism used in connection with a tarpaulin which selectively covers and uncovers a vehicle body includes a transmitting member for causing the tarpaulin to move. A drive sprocket is connected to the transmitting member and is rotated by a crank handle mounted coaxially on the drive sprocket shaft. A forward motion pawl resiliently engages a ratchet on the shaft to assure one way operation when the handle is in its operative condition. A safety pawl is selectively moveable into engagement with the drive sprocket for preventing any inadvertent rotation of the drive sprocket.

22 Claims, 2 Drawing Sheets

U.S. Patent    May 18, 1993    Sheet 1 of 2    5,211,440
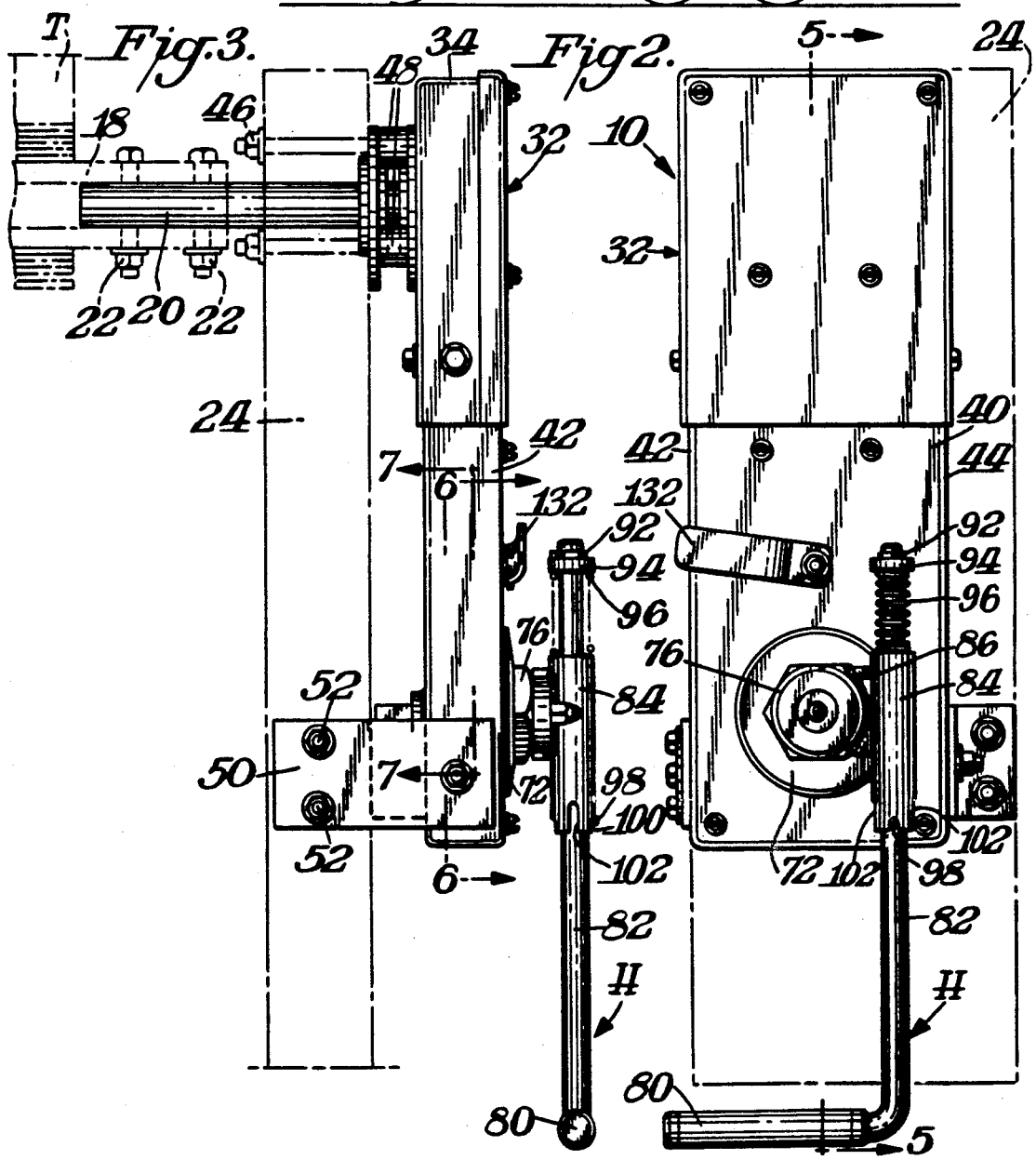

SAFETY MECHANISM FOR VEHICLE TARPAULIN SYSTEM

BACKGROUND OF INVENTION

Tarpaulins are frequently used for covering and uncovering vehicle bodies, such as truck bodies. It is desirable that such tarpaulin systems include some means for conveniently moving the tarpaulin to and from its covered and uncovered conditions, as well as to intermediate positions if desired. A conventional manner of manipulating the tarpaulin is by means of some form of handle which would be rotated, for example, to move the tarpaulin from its completely covered position to its uncovering position. There is a danger with conventional arrangements that the handle might slip from the operator and spin at a fast speed causing injury to the operator. A further concern is that the handle might inadvertently be manipulated, such as during truck movement to effect the degree of covering of the tarpaulin.

SUMMARY OF INVENTION

An object of this invention is to provide a safety mechanism to assure a proper and safe operation of the handle used for controlling the selective covering and uncovering of a tarpaulin on a vehicle body.

A further object of this invention is to provide such a safety mechanism which is convenient to use and which incorporates standardized parts to facilitate its low cost manufacture.

In accordance with this invention the safety mechanism includes a transmitting member which is connected to the tarpaulin member is connected to a drive sprocket, so that when the drive sprocket is rotated the transmitting member causes the tarpaulin to move. A crank handle is mounted to the clutch hub on the drive sprocket shaft. The hub also includes a ratchet structure having a forward motion pawl in resilient contact with the ratchet to assure movement of the drive sprocket in the forward motion direction when the handle is operatively engaged. A safety pawl is also provided which engages teeth on the shaft to prevent any motion and thereby lock the handle and tarpaulin in a fixed position.

In a preferred practice of the invention the safety pawl engages the drive sprocket teeth. The safety pawl, the drive sprocket, the clutch, the ratchet and the forward motion pawl are also preferably mounted in a housing. A safety latch mounted outside the housing is connected to the safety pawl to permit selective movement of the safety pawl to and from its operative condition from outside the housing.

In the preferred practice of the invention the transmitting member is a sprocket roller mounted coaxially with a motion transmitting sprocket which in turn is operatively connected with the drive sprocket by a chain. The safety mechanism clutch assembly engages the drive sprocket when the handle is rotated in the forward direction for uncovering the vehicle. Conversely, when the handle is moved back in the opposite direction, the clutch assembly is disengaged and the drive sprocket is rendered free rotating so that spring mechanisms associated with the tarpaulin can urge the tarpaulin back to its covering condition. The handle can be used to control the degree of engagement of the clutch assembly to control the speed of return of the tarpaulin.

THE DRAWINGS

FIG. 1 is a side elevational view showing the safety mechanism of this invention mounted on a vehicle;

FIG. 2 is a front elevational view of the safety mechanism shown in FIG. 1;

FIG. 3 is a side elevational view of the safety mechanism shown in FIG. 2;

DETAILED DESCRIPTION

Figure 5:
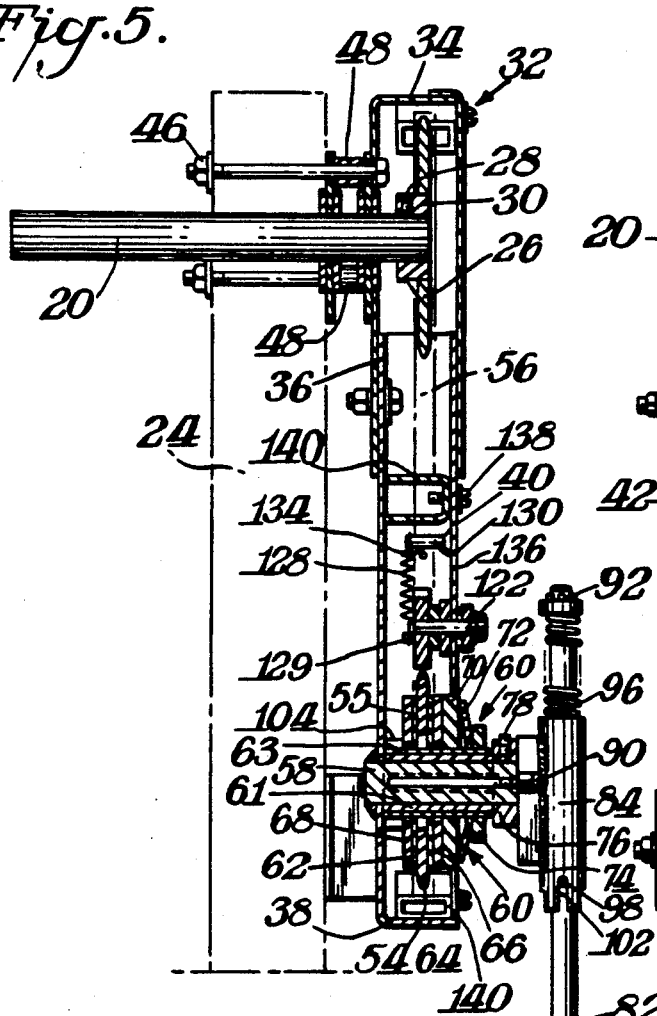
FIG. 5 is a cross-sectional view taken through FIG. 4 along the line 5—5.

The present invention is directed to a safety mechanism for assuring safe operation of a tarpaulin which is moved to its uncovering position by rotation of a handle. FIG. 1 illustrates a suitable use for the safety mechanism 10 of this invention. As shown therein safety mechanism 10 is mounted on a suitable vehicle V which may be an open top truck having a body B covered by a tarpaulin T. The tarpaulin T may completely or only partially cover the open top or may permit the top to be completely uncovered. FIG. 1 illustrates the tarpaulin to partially cover truck body B. In this respect the end of tarpaulin T is mounted to arms 12 on each side of body B. Each arm 12 includes a torsion spring 14 for urging the arms in a clockwise direction so that the tarpaulin may be moved to the completely horizontal position where it would rest upon the upper support member 16 of body B.

It is to be understood that although the invention is particularly suitable with tarpaulin cover systems such as described and illustrated with respect to FIG. 1 wherein arms are urged by torsion springs to facilitate the movement of the tarpaulin, the safety mechanism may be used with any system involving the use of a handle to manipulate the tarpaulin to either an open or closed position wherein it is desired to assure that there will be a controlled operation of the handle thereby avoiding any possibility of the handle spinning in an uncontrolled dangerous manner.

FIGS. 2-7 illustrate the details of safety mechanism 10. As best shown in FIG. 3 the tarpaulin T is mounted to a roller 18 which in turn is connected to sprocket roller 20 by any suitable fasteners 22. Sprocket roller 20 may be considered a transmitting member in the sense that the rotation of sprocket roller 20 is transmitted to roller 18 which in turn causes the tarpaulin T to be wound upon roller 18 during the uncovering movement of the tarpaulin. Roller 20 extends through a suitable opening in the frame 24 of the truck body.

Figure 4:
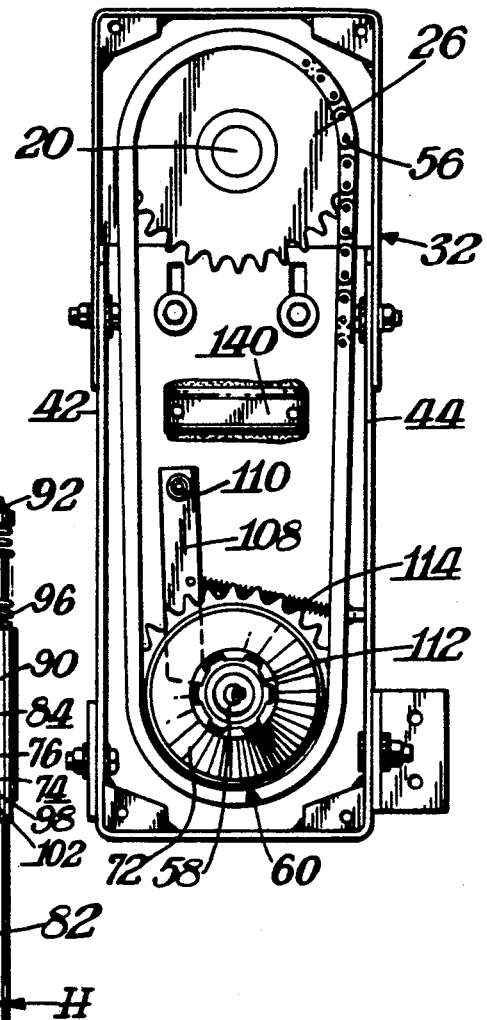
FIG. 4 is a rear elevational view of the safety mechanism shown in FIGS. 2-3.

As shown in FIG. 5 the motion transmitting sprocket 26 is mounted coaxially on roller 20 by means of fastener 28 engaged in hub 30. Sprocket 26 is mounted in the housing 32 having a top wall 34, a rear wall 36, a bottom wall 38, a front wall 40 and side walls 42, 44 (FIGS. 4-5). Housing 32 is connected to frame 24 by any suitable fasteners 46 in the manner best shown in FIG. 5. As also shown in FIG. 5 spacers 48 are provided to assure proper positioning of housing 32 on frame 24. FIG. 3 also illustrates a bracket 50 securing the lower portion of housing 34 to frame 24 by means of any suitable fasteners 52.

It is to be understood that the manner of mounting safety mechanism 10 to a vehicle may vary and the illustrated manner is merely exemplary. Thus, for example, roller 20 may be mounted in bearings with sprocket 26 mounted to roller 20 without any spacers.

Also mounted within housing 32 is a drive sprocket 54 operatively connected to motion transmitting sprocket 26 by means of chain 56. Accordingly, when drive sprocket 54 rotates its rotational movement is transmitted to sprocket 26 which in turn transmits its rotational movement to roller 20 to cause the tarpaulin to move.

FIG. 5 also illustrates details of the structure within housing 32. This structure includes drive shaft 58 upon which drive sprocket 54 is mounted. Additionally, a clutch mechanism 60 is mounted on drive shaft 58. Clutch mechanism or assembly 60 includes a bearing 61 mounted directly on shaft 58. A threaded hub 63 is mounted on bearing 61. Hub 63 includes spaced longitudinal grooves or recesses. A clutch pad 62,64 is mounted around hub 63 disposed on each side of sprocket 54. A clutch plate 66 is mounted against clutch pad 64 while a plate 68 is mounted against clutch pad 62. Plates 66,68 contain extensions which fit in the hub recesses to lock the plates 66,68 to hub 63. As also shown in FIG. 5 a disk 70 is mounted against plate 66 and locked to hub 63 by engagement of extensions in the hub recesses. A pressure disk 72 is next mounted on shaft 58 against disk 70. The assembly also includes a tension nut 74 disposed against tension washer or disk 72. A locking collar 76 is mounted at the end of shaft 58 by fastener 78. When clutch 60 is disengaged sprocket 54 is free wheeling by being mounted on ring 55.

It is to be understood that the invention may be practiced with standard or reverse threads on the clutch mechanism.

Safety mechanism 10 operates in conjunction with handle H. Handle H has an offset portion 80 which would be gripped and rotated by the user and has a straight portion or main leg 82 generally parallel to housing front face 40. Main leg 82 extends through sleeve 84. As illustrated a plate 86 forms an integral extension with sleeve 84 and is secured by welding or by any other suitable means to the connecting nut 74 which is in threaded engagement with hub 63 to mount handle H detachably on shaft 58. A grease fitting 90 extends through shaft 58 as best illustrated in FIG. 5 and terminates beyond locking collar 76.

Handle H terminates at its end opposite offset 80 in a pin 92 such as a cotter pin extending through the end of handle leg 82. A ring 94 is mounted inwardly of pin 92 to act as a bearing surface for spring 96. Spring 96 is secured within sleeve 84 to urge offset portion 80 in a direction toward sleeve 84. The resilient force of spring 92 is resisted by pins 98 extending from main leg 82. In this regard, two sets of slots 100,102 are provided in sleeve 84 for receiving pins 98. Accordingly, it is possible to lock handle H in two different positions 90° apart in accordance into which set of slots the pins 98 are engaged. For example, in the position shown in FIG. 2 pins 98 are engaged in slots 100 which is the position of the handle in its stored condition. When in this position, offset portion 80 is parallel to and spaced fairly closely with the housing 32. In its operative position, shown in FIG. 5, pins 98 are in slots 102 and offset portion 80 is perpendicular to housing 32 where it is in a position more readily accessible to the user.

One of the features of this invention is the provision of a mechanism for assuring that the handle can rotate in only one direction when clutch 60 is engaged. In this respect, clutch 60 is engaged by rotating handle H in a clockwise direction which causes nut 74 to move inwardly on hub 63 which in turn puts pressure on the clutch pads 62,64 to cause clutch pads 62,64 to engage in firm contact with drive sprocket 54. At the opposite end of shaft 58 hub 63 includes radial extensions or its recesses to comprise teeth and function as a ratchet 104. The inner wall 36 includes a forward motion pawl 108 pivotally mounted at pin 110 with its tooth 112 disposed for engagement with forward motion ratchet 104. Any suitable means, such as spring 114 is utilized to urge tooth 112 into engagement with the teeth in ratchet 104.

Figure 6:
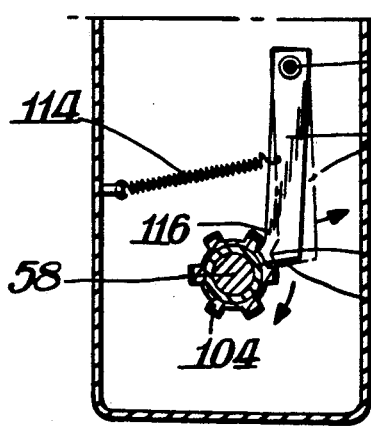
FIG. 6 is a cross-sectional view taken through FIG. 3 along the line 6—6.

As shown in FIG. 6 tooth 112 has a slanted or camming surface 116 with a straight surface 118 so that the tooth 112 of pawl 108 will move in and out of ratchet 104 as the ratchet is moved in a clockwise direction as indicated by the arrow in FIG. 6. The in and out movement of pawl 108 is also indicated by an arrow and one of its positions is shown in solid with the other position being in phantom. When, however, there would be an attempt to move ratchet 104 in an opposite direction, the straight surface of 118 of pawl 108 would prevent any reverse movement. Accordingly, if during the uncovering operation of the tarpaulin T, the handle H should slip from the operator's hand the tendency for the tarpaulin to move in its reverse direction on the influence of the torsion springs 14 which in turn would result in a dangerous spinning of the handle is prevented by the one way locking action of pawl 108 and ratchet 104.

Figure 7:
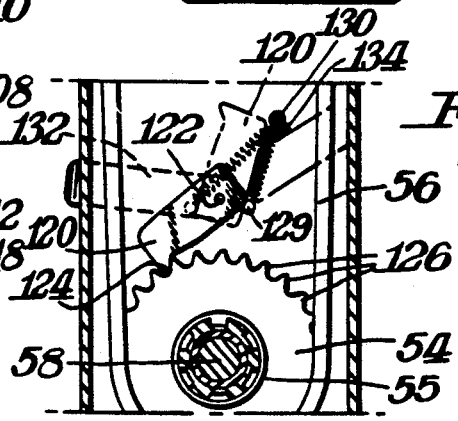
FIG. 7 is a cross-sectional view taken through FIG. 3 along the line 7—7.

FIG. 7 best illustrates a further feature of this invention wherein the safety mechanism 10 includes a further means to prevent any movement of the sprocket 54 in any direction. As shown in FIG. 7 a latch or safety pawl 120 is provided which may be mounted in any suitable manner, such as by being pivotally mounted on pin 122 to front wall 40 as best shown in FIG. 5. Pawl 120 includes a tooth 124 shaped for engagement with the teeth 126 of drive sprocket 54. It is to be understood, however, that the same principles may be applied by engaging the pawl with any other teeth or ratchet mechanism on shaft 58. When pawl tooth 124 is engaged between sprocket teeth 126 sprocket 54 is prevented from any movement in either direction. Engagement is assured by means of spring 128 mounted to pawl 120 at one end to pin 129 on pawl 120 and mounted to housing wall 40 by pin 130 at its opposite end. FIG. 7 illustrates pawl 120 to be in its operative locking condition in full line. FIG. 7 also illustrates pawl 120 to be in its inactive position in phantom lines.

In accordance with this invention pawl 120 may be moved to and from its operative and inactive positions by means of latch 132 which is mounted to the outer face 40 of housing 32 coaxially on pin 122. Accordingly, there is a rigid connection between latch 132 and pawl 120. When latch 132 is moved to the position shown in FIG. 7 and also shown in FIG. 2 pawl 120 is moved to the position shown in solid in FIG. 7 where its tooth 124 is engaged between teeth 126. Spring 128 resiliently holds pawl 120 in the engaged position. Pawl 120 is maintained in this position during the inactive condition of the handle. While in this position, the safety mechanism prevents any inadvertent movement of the sprocket 54 while unattended such as during driving. This locking of sprocket 54 also prevents movement of handle H when the clutch is engaged. When the clutch is engaged but handle H rotates from, for example, vibrations during driving, the clutch may become disengaged but sprocket 54 is still prevented from rotating.

When it is desired to manipulate handle H it is necessary to move pawl 120 to its inactive position. This is accomplished by rotating latch 132 clockwise with respect to FIG. 2. Concurrently pawl 122 is also rotated clockwise to the position shown in phantom in FIG. 7. When spring 128 moves past the shaft 122 the action of spring 128 is such as to urge pawl 120 in the clockwise direction shown in FIG. 7. Pawl 120 is halted in its movement by a projection 134 secured to pin 130 which acts as a stop member in the path of movement of pawl 120. If desired pawl 120 may be dimensioned or pin 130 positioned so that pin 130 is the stop member. Accordingly, spring 128 in connection with the movement of latch 122 functions to move pawl 120 to either of two positions, both of which are determined by pawl 120 contacting either sprocket teeth 126 or stop member 134.

For the sake of convenience, a portion of front wall 40 may include a plate member 136 which is secured by means of fasteners 138 connected to U-shaped bracket 140 mounted to inner wall 36 of housing 32. Plate member 136 may easily be removed to gain access to the interior of housing 32.

In operation the tarpaulin T would be disposed in a horizontal position covering the open top of body B of vehicle V. When it is desired to uncover the vehicle top, handle H is moved from its inactive position shown in FIGS. 2-3 to its active position shown in FIG. 5. This is accomplished by pulling outwardly on offset portion 80 away from sleeve 84 so that the pins 98 may be moved from being seated in slots 100 to become seated in slots 102. Latch 134 is moved from the position shown in solid where pawl 120 is engaged with teeth 12 to the position shown in phantom where pawl 120 is in its inactive position. Handle portion 80 is rotated to activate the clutch mechanism 60 so that drive sprocket 54 moves in response to the rotation of handle H which turns shaft 58. The rotation of sprocket 54 is transmitted by chain 56 to sprocket 26 and in turn to roller or transmitting member 20 secured to tarp roller 18 for winding the tarpaulin T around roller 18 thereby raising arms 12 on vehicle V to overcome the force of tension springs 14. Movement in the uncovering direction is assured by the engagement of pawl 108 with ratchet 104.

Should the handle slip from the operator's hand any reverse movement or free spinning of handle H is prevented by pawl 108. When there is a sufficient uncovering of the vehicle top, latch 132 is moved to the position shown in solid in FIG. 7 and the position shown in FIG. 2 wherein pawl 120 is engaged with the teeth 126 of sprocket 54. This arrangement prevents any movement of sprocket 54 to thereby maintain the tarpaulin in the desired condition. When it is desired to again cover the truck body, latch 132 is moved to rotate pawl 120 to its inactive position shown in phantom in FIG. 7. Handle H is backed off and rotated slightly in the reverse direction, such as a quarter turn to disengage clutch 60 from drive sprocket 54. Handle H could also be put in its inactive stored condition by a pull and twist movement so that pins 98 are seated in slots 100. Since clutch 60 is disengaged sprocket 54 becomes free spinning and the torsion springs 14 cause arms 12 to rotate in a clockwise direction or unwinding tarpaulin T from roller 18 until the tarpaulin is in its horizontal covered condition.

An advantageous feature of this invention is the ability to use handle H as a brake or speed control device for controlling the speed of the tarpaulin returning to its covered position. If the operator considers the speed to be too fast handle H could be rotated to again begin to engage the clutch mechanism. As long as clutch mechanism 60 is not fully engaged sprocket 54 will continue to rotate but its speed of rotation will be controlled by the degree of its contact by clutch pads 62,64. Thus, the speed could be controlled by the manipulation of handle H.

What is claimed is:

1. Safety mechanism for manipulating a tarpaulin mounted to a tarpaulin moving device for selectively covering and uncovering a vehicle body, comprising a transmitting member for connection to the tarpaulin moving device for causing the moving device to move in response to movement by said transmitting member, a drive sprocket, means connecting said drive sprocket to said transmitting member when said drive sprocket is rotated, said drive sprocket being mounted on a shaft, a crank handle selectively operatively mounted to said shaft for rotating said drive sprocket, a ratchet mounted coaxially with said drive sprocket on said shaft, a forward motion pawl, first resilient means urging said forward motion pawl into engagement with said ratchet to prevent said handle from rotating in a reverse direction when said handle is in its operative condition, a safety pawl, a safety latch connected to said safety pawl for selectively moving said safety pawl to an operative position and to an inactive position, and second resilient means connected to and acting directly against said safety pawl for urging said safety pawl into engagement with teeth on said drive shaft when said safety pawl is in said operative position to prevent rotation of said drive sprocket.

2. The mechanism of claim 1 wherein said teeth on said drive shaft are the teeth of said drive sprocket.

3. The mechanism of claim 2 wherein said latch is a lever rigidly connected to said safety pawl for controlling the movement of said safety pawl.

4. The mechanism of claim 3 wherein said safety pawl and said shaft and said drive sprocket and said ratchet are mounted in a housing, and said latch being mounted outside of said housing.

5. Safety mechanism for manipulating a tarpaulin mounted to a tarpaulin moving device for selectively covering and uncovering a vehicle body, comprising a transmitting member for connection to the tarpaulin moving device for causing the moving device to move in response to movement by said transmitting member, a drive sprocket, means connecting said drive sprocket to said transmitting member when said drive sprocket is rotated, said drive sprocket being mounted on a shaft, a crank handle selectively operatively mounted to said shaft for rotating said drive sprocket, a ratchet mounted coaxially with said drive sprocket on said shaft, a forward motion pawl, first resilient means urging said forward motion pawl into engagement with said ratchet to prevent said handle from rotating in a reverse direction when said handle is in its operative condition, a safety pawl, a safety latch connected to said safety pawl for selectively moving said safety pawl to an operative position and to an inactive position, second resilient means urging said safety pawl into engagement with teeth on said drive shaft when said safety pawl is in said operative position to prevent rotation of said drive sprocket, said teeth on said drive shaft being the teeth of said drive sprocket, said latch being a lever rigidly connected to said safety pawl for controlling the movement of said safety pawl, said safety pawl and said shaft and said drive sprocket and said ratchet being mounted in a housing, said latch being mounted outside of said housing, a stop member in said housing, and spring means connected to said safety pawl for selectively urging said safety pawl into engagement with said teeth and into abutment with said stop member.

6. The mechanism of claim 5 wherein said transmitting member is a sprocket roller.

7. The mechanism of claim 6 including a motion transmitting sprocket, said sprocket roller being axially connected to said motion transmitting sprocket, and a chain connecting said motion transmitting sprocket to said drive sprocket.

8. The mechanism of claim 7 including a clutch assembly for selectively engaging said handle with said drive sprocket whereby said drive sprocket moves in response to movement of said handle during engagement of said clutch assembly and whereby said drive sprocket is free spinning during disengagement of said clutch assembly.

9. The mechanism of claim 8, in combination therewith, a tarpaulin having a pair of ends, one of said ends of said tarpaulin being mounted to a tarpaulin roller, and said tarpaulin roller being coaxially mounted to said sprocket roller.

10. The combination of claim 9 including a vehicle having an open top vehicle body, a pair of arms mounted to said vehicle body, the other of said ends of said tarpaulin being secured to said arms, and torsion spring means urging said arms in a direction away from said sprocket roller.

11. Safety mechanism for manipulating a tarpaulin mounted to a tarpaulin moving device for selectively covering and uncovering a vehicle body, comprising means urging the tarpaulin to move in a first direction, a transmitting member for connection to the tarpaulin moving device for causing the moving device to move in response to movement by said transmitting member in a second direction which is opposite to said first direction, a drive sprocket, means connecting said drive sprocket to said transmitting member when said drive sprocket is rotated, said drive sprocket being mounted on a shaft, a clutch assembly mounted on said shaft, said clutch assembly including an externally threaded hub mounted on said shaft, said drive sprocket being mounted in a free wheeling manner on said shaft, at least one clutch pad on said shaft juxtaposed said drive sprocket, at least one clutch plate locked to said hub juxtaposed said clutch pad, a nut threaded on said hub for being moved on said hub to cause said pad to engage said drive sprocket and lock said drive sprocket to said shaft, a crank handle selectively operatively mounted to said shaft by means of connection to said nut for rotating said drive sprocket when said clutch assembly is engaged, a forward motion ratchet mounted coaxially with said drive sprocket on said shaft, a forward motion pawl, first resilient means urging said forward motion pawl into engagement with said forward motion ratchet to prevent said shaft and said drive sprocket from rotating in a reverse direction when said handle is in its operative condition whereby rotation of said handle causes said drive sprocket to rotate to move the tarpaulin in said second direction and to prevent the tarpaulin from moving in said first direction when said clutch assembly is engaged, means connecting said drive sprocket to said shaft to permit said drive sprocket to have only two conditions of movement, one of said conditions of movement being in a forward motion under the directional control of said forward motion ratchet when said clutch assembly is engaged and said handle and said shaft are rotated to move the tarpaulin in said second direction for uncovering the vehicle body, the other of said conditions of movement being free wheeling when said clutch assembly is disengaged by a backing off rotation of said handle to permit the tarpaulin to move in said first direction in response to said urging means, and said handle and said shaft remaining stationary during said free wheeling movement of said drive sprocket.

12. The mechanism of claim 11 wherein said forward motion pawl comprises teeth extending radially from said hub.

13. The mechanism of claim 12 including a safety pawl, a safety latch connected to said safety pawl for selectively moving said safety pawl to an operative position and to an inactive position, and second resilient means urging said safety pawl into engagement with teeth on said drive shaft when said safety pawl is in said operative position to prevent rotation of said drive sprocket.

14. The mechanism of claim 13 wherein said teeth on said drive shaft are the teeth of said drive sprocket.

15. The mechanism of claim 14 wherein said latch is a lever rigidly connected to said safety pawl for controlling the movement of said safety pawl.

16. The mechanism of claim 15 wherein said safety pawl and said shaft and said drive sprocket and said clutch assembly are mounted in a housing, and said latch being mounted outside of said housing.

17. Safety mechanism for manipulating a tarpaulin mounted to a tarpaulin moving device for selectively covering and uncovering a vehicle body, comprising means urging the tarpaulin to move in a first direction, a transmitting member for connection to the tarpaulin moving device for causing the moving device to move in response to movement by said transmitting member in a second direction which is opposite to said first direction, a drive sprocket, means connecting said drive sprocket to said transmitting member when said drive sprocket is rotated, said drive sprocket being mounted on a shaft, a clutch assembly mounted on said shaft, said clutch assembly including an externally threaded hub mounted on said shaft, said drive sprocket being mounted in a free wheeling manner on said hub, at least one clutch pad on said shaft juxtaposed said drive sprocket, at least one clutch plate locked to said hub juxtaposed said clutch pad, a nut threaded on said hub for being moved on said hub to cause said pad to engage said drive sprocket and lock said drive sprocket to said shaft, a crank handle selectively operatively mounted to said shaft by means of connection to said nut for rotating said drive sprocket when said clutch assembly is engaged, a ratchet mounted coaxially with said drive sprocket on said shaft, a forward motion pawl, first resilient means urging said forward motion pawl into engagement with said ratchet to prevent said drive sprocket form rotating in a reverse direction when said handle is in its operative condition whereby rotation of said handle causes said drive ratchet to rotate to move the tarpaulin in said second direction and to prevent the tarpaulin from moving in said first direction when said clutch assembly is engaged, said forward motion pawl comprising teeth extending radially from said hub, a safety pawl, a safety latch connected to said safety pawl for selectively moving said safety pawl to an operative position and to an inactive position, second resilient means urging said safety pawl into engagement with teeth on said drive shaft when said safety pawl is in said operative position to prevent rotation of said drive sprocket, said teeth on said drive shaft being the teeth of said drive sprocket, said latch being a lever rigidly connected to said safety pawl for controlling the movement of said safety pawl, said safety pawl and said shaft and said drive sprocket and said clutch assembly being mounted in a housing, said latch being mounted outside of said housing, a stop member in said housing, and spring means connected to said safety pawl for selectively urging said safety pawl into engagement with said teeth and into abutment with said stop member.

18. The mechanism of claim 17 wherein said transmitting member is a sprocket roller, a motion transmitting sprocket, said sprocket roller being axially connected to said motion transmitting sprocket, and a chain connecting said motion transmitting sprocket to said drive sprocket.

19. The mechanism of claim 18 wherein said handle is slidably mounted in a sleeve, said sleeve being connected to said nut, said handle having a main leg within said sleeve and terminating in an offset for manipulating by the operator, said sleeve having sets of slots displaced 90° apart, and said main leg having pin means for controlling the orientation of said offset in accordance with the engagement of said pin means in one of said sets of slots.

20. The mechanism of claim 18, in combination therewith, a tarpaulin having a pair of ends, one of said ends of said tarpaulin being mounted to a tarpaulin roller, and said tarpaulin roller being coaxially mounted to said sprocket roller.

21. The combination of claim 20 including a vehicle having an open top vehicle body, a pair of arms mounted to said vehicle body, the other of said ends of said tarpaulin being secured to said arms, and torsion spring means urging said arms in a direction away from said sprocket roller.

22. The mechanism of claim 11 wherein said first resilient means constantly maintains said forward motion pawl in contact with said forward motion ratchet without there being any non-contacting position of said forward motion pawl with said forward motion ratchet.

* * * * *